(12) United States Patent
Katayama

(10) Patent No.: US 6,356,746 B1
(45) Date of Patent: Mar. 12, 2002

(54) DIRECT CONVERTING RECEIVER

(75) Inventor: Hiroshi Katayama, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/313,008

(22) Filed: May 17, 1999

(30) Foreign Application Priority Data

Jul. 24, 1998 (JP) .......................................... 10-209854

(51) Int. Cl.[7] .................................................. H04B 1/26
(52) U.S. Cl. ...................... 455/324; 455/323; 455/209; 455/214; 455/161.3
(58) Field of Search ................................ 455/324, 323, 455/205, 208, 209, 214, 130, 131, 161.3, 266, 339, 340; 329/300, 302; 375/335

(56) References Cited

U.S. PATENT DOCUMENTS

| | | | | |
|---|---|---|---|---|
| 5,451,899 A | * | 9/1995 | Lawton | 329/302 |
| 5,612,976 A | * | 3/1997 | Granger-Jones | 375/322 |
| 5,617,451 A | * | 4/1997 | Mimura et al. | 375/340 |
| 5,894,499 A | * | 4/1999 | Katayama et al. | 375/334 |
| 6,038,268 A | * | 3/2000 | Kawai | 375/334 |

\* cited by examiner

*Primary Examiner*—Dwayne Bost
*Assistant Examiner*—Lewis West
(74) *Attorney, Agent, or Firm*—Pearne & Gordon LLP

(57) ABSTRACT

Signal levels of received signals are detected within a plurality of different frequency bands by a first electric field strength detecting means 15 and a second electric field strength detecting means 16, then it is detected by an adjacent wave detecting means 17 based on this output signal whether or not adjacent waves are contained, then a filter controlling signal 19 is output to a first I low-pass filter 9a and a first Q low-pass filter 10a from a baseband filter controlling means 18 according to whether or not the adjacent waves are contained, whereby low-frequency cut-off frequencies of the first I low-pass filter 9a and a first Q low-pass filter 10a are switched and controlled. Accordingly, a receiving sensitivity can be improved by reducing an influence of an adjacent wave and a tolerance for frequency offset of an oscillation frequency of a local oscillator relative to a carrier frequency of a received signal can be enhanced.

10 Claims, 11 Drawing Sheets

DIRECT CONVERTING RECEIVER

BACKGROUND OF THE INVENTION

1. Field of the Invention

The present invention relates to a mobile communication device such as a personal handy phone, a mobile telephone, a pager, etc. and, more particularly, a direct converting receiver to which a direct conversion system is applied.

2. Description of the Prior Art

In recent years, radio communication systems such as a personal handy phone, a mobile telephone, a radio paging device (pager), a cordless telephone, etc., which are employed mainly in mobile communication, have been drastically spread. As a receiver system of these radio communication systems, a direct converting receiver whose configuration is ready to be integrated and is suitable for miniaturization and light weight has been known.

As the direct converting receiver in the prior art, a configuration as disclosed in Unexamined Patent Publication Hei 7-135514, for example, has been known. An example of a receiver circuit of the direct converting receiver in the prior art is shown in FIG. 17. FIG. 17 shows a configuration of the receiver circuit to which frequency shift keying (abbreviated as "FSK" hereinafter) is applied. The configuration and an operation of the receiver circuit will be explained hereinafter.

The direct converting receiver comprises a receiving antenna 101 for receiving a radio signal, a signal attenuator (ATT) 102 for attenuating a received signal, a received signal amplifier 104 for amplifying the received signal supplied from the signal attenuator 102 and outputting it as a modulated signal 103, a local oscillator 106 for generating a local signal 105, a 90-degree phase shifter 107 for shifting a phase of the local signal 105 by 90 degree, a first signal mixer 108 for mixing the modulated signal 103 with the local signal 105, and a second signal mixer 109 for mixing the modulated signal 103 with the local signal 105 which has been subjected to 90 degree phase shift.

Further, an I low-pass filter 111 and a Q low-pass filter 113 are provided in the direct converting receiver. The I low-pass filter 111 can pass only a baseband signal which is common in phase with the received signal, which is contained in an output signal of the first signal mixer 108, (i.e., an I baseband signal from which harmonic components are removed) to then output an I baseband signal 110. The Q low-pass filter 113 can pass only a baseband signal which is obtained by phase-shifting the received signal, which is contained in an output signal of the second signal mixer 109, by 90 degree (i.e., a Q baseband signal from which harmonic components are removed) to then output a Q baseband signal 112 which is intersected orthogonally with the I baseband signal 110. These low-pass filters 111, 113 are composed of filters which have a fixed cut-off frequency, i.e., whose cut-off frequency is not varied, respectively.

Furthermore, there are provided a demodulating means 115 and an electric field strength detecting means 116. The demodulating means 115 can receive the I baseband signal 110 and the Q baseband signal 112, then demodulate them, and then output a demodulated signal 114. The electric field strength detecting means 116 can receive the I baseband signal 110 to detect a level of the received signal, and then output a control signal to the signal attenuator 102.

Next, a receiving operation of the direct converting receiver constructed as above in the prior art will be explained hereunder. First, the radio signal being received by the receiving antenna 101 is input into the signal attenuator 102 which can control the level of the received signal in compliance with the control signal supplied from the electric field strength detecting means 116. The output signal of the signal attenuator 102 is amplified by the received signal amplifier 104, and then output to the first signal mixer 108 and the second signal mixer 109 as the modulated signal 103 respectively. In the meanwhile, the local signal 105 being generated from the local oscillator 106 is mixed with the modulated signal 103 in the first signal mixer 108 and then output to the I low-pass filter 111. At the same time, a phase of the local signal 105 is shifted by 90 degree by the 90-degree phase shifter 107, then the local signal 105 is mixed with the modulated signal 103 in the second signal mixer 109 and then output to the Q low-pass filter 113.

Then, the I baseband signal 110 and the Q baseband signal 112 derived after they have been passed through the I low-pass filter 111 and the Q low-pass filter 113 respectively are output to the demodulating means 115 and then demodulated there to produce the demodulated signal 114. Also, the electric field strength detecting means. 116, when receives the I baseband signal 110, detects a level of the received signal and then outputs the control signal, which is in proportion to the level of the received signal, to the signal attenuator 102.

In the radio receiver, if other radio waves in addition to the desired received wave to be received are caught as the interference waves by the receiving antenna simultaneously, particularly if a plurality of interference waves whose signal levels are high to such extent that they exert an influence upon the receiving bandwidth are caught, there has been such a problem that distortion due to the intermodulation is caused between these received radio wave signals and thus receiving sensitivity of the desired received waves to be received (desired signal) is degraded.

In order to improve the above problem, the technology has been proposed wherein generation of the distortion in the amplifier or the signal mixer can be suppressed by controlling a gain of a receiver system in response to the level of the received signal, which is generally called AGC (Automatic Gain Control), to thus improve the receiving sensitivity of the desired signal to be received. If this technology is applied to the configuration in FIG. 17, an AGC means can be so constructed that the electric field strength detecting means 116 outputs the control signal to the signal attenuator 102, which is positioned immediately after the antenna, in response to the level of the received signal, and then the signal attenuator 102 controls the level of the received signal received by the receiving antenna 101 based on this control signal. According to such AGC means, it is possible to suppress the distortion due to the intermodulation caused in the received signal amplifier 104, the first signal mixer 108, and the second signal mixer 109.

In recent, the demand for the direct converting receiver which is suitable for IC integration has been enhanced with the drastic spread of the radio communication systems such as the mobile telephone, etc., and a communication capacity for mobile communication has been increased abruptly with increase of the user of the mobile communication. In answer to the increase in the demand for such mobile communication, there has been a need to enhance a transmission speed in the radio communication and to proceed a narrower bandwidth of the communication frequency.

In the event that low-pass cut-off frequencies of the I low-pass filter and the Q low-pass filter are set lower so as to take preference of reduction in the influence of the interference wave by the radio waves in adjacent channels (i.e., adjacent waves) when the bandwidth of the direct converting receiver is made narrower, such a problem has arisen that, if the oscillation frequency of the local oscillator has been widely offset and deviated from the carrier frequency of the received waves, desired components of the received signal are out of the passbands of the I low-pass filter and the Q low-pass filter and thus such desired components are eliminated and not to be demodulated.

In the direct converting receiver in the prior art, since normally respective cut-off frequencies of the I low-pass filter and the Q low-pass filter are fixed, there has been such a necessity that the configuration in which low-frequency cut-off frequencies of the I low-pass filter and the Q low-pass filter are set slightly higher at the sacrifice of adjacent wave cut-off characteristics to overcome the above problem must be employed.

SUMMARY OF THE INVENTION

The present invention has been made in light of the above circumstances, and it is an object of the present invention to provide a direct converting receiver which is capable of reducing an influence of an adjacent wave by varying a cut-off frequency of a low-pass filter in response to a signal level of the adjacent wave, and improving a tolerance for frequency offset of an oscillation frequency of a local signal from a carrier frequency of a modulated signal to be received.

In order to achieve the above object, according to first aspect of the present invention, a direct converting receiver comprises a local oscillator for generating a local signal; a first signal mixer for mixing the local signal with a modulated signal based on a received signal; a second signal mixer for mixing the modulated signal with a signal which is obtained by phase-shifting the local signal by 90 degree; an I low-pass filter for eliminating a high frequency component of an output signal of the first signal mixer; an Q low-pass filter for eliminating a high frequency component of an output signal of the second signal mixer; a demodulating means for generating a demodulated signal of the received signal by processing an I baseband signal based on an output of the I low-pass filter and a Q baseband signal based on an output of the Q low-pass filter; an adjacent wave detecting means for detecting a signal level of the received signal in a plurality of different frequency bands based on at least one of outputs of the I low-pass filter and the Q low-pass filter and then detecting a signal level of the adjacent wave; and a baseband filter controlling means for variably controlling the cut-off frequencies of the I low-pass filter and the Q low-pass filter according to an output signal of the adjacent wave detecting means.

In the direct converting receiver, if the cut-off frequencies of the I low-pass filter and the Q low-pass filter are lowered when an influence degree of the adjacent waves is large based on the signal level of the adjacent waves detected by the adjacent wave detecting means, e.g., the presence of the adjacent waves, the influence of the adjacent waves can be reduced and deterioration in the receiving sensitivity can be reduced. While, if the cut-off frequencies of the I low-pass filter and the Q low-pass filter are raised when the influence degree of the adjacent waves is small, the tolerance for the frequency offset of the oscillation frequency of the local oscillator, which is decided by the cut-off frequencies of the low-pass filters, with respect to the carrier frequency of the received signal can be enhanced. As a result, the receiving sensitivity can be improved and interference by the adjacent channels can be reduced, and also the tolerance for the frequency offset of the oscillation frequency of the local oscillator relative to the carrier frequency of the received signal can be improved.

According to second aspect of the present invention, a direct converting receiver comprises a local oscillator for generating a local signal; a first signal mixer for mixing a modulated signal based on a received signal with the local signal; a second signal mixer for mixing the modulated signal with a signal which is obtained by phase-shifting the local signal by 90 degree; a first I low-pass filter for extracting an I baseband signal by eliminating a high frequency component of an output signal of the first signal mixer; a second I low-pass filter having a cut-off frequency which is different from that of the first I low-pass filter; a first Q low-pass filter for extracting a Q baseband signal by eliminating a high frequency component of an output signal of the second signal mixer; a second Q low-pass filter having a cut-off frequency which is different from that of the first Q low-pass filter; a demodulating means for generating a demodulated signal of the received signal by processing the I baseband signal and the Q baseband signal; a first electric field strength detecting means for detecting a signal level of the received signal based on at least one of outputs of the first I low-pass filter and the first Q low-pass filter; a second electric field strength detecting means for detecting a signal level of the received signal based on at least one of outputs of the second I low-pass filter and the second Q low-pass filter; an adjacent wave detecting means for detecting a signal level of the adjacent wave based on outputs of the first electric field strength detecting means and the second electric field strength detecting means; and a baseband filter controlling means for variably controlling the cut-off frequencies of the first I low-pass filter and the first Q low-pass filter according to an output signal of the adjacent wave detecting means.

In the direct converting receiver, if the cut-off frequencies of the I low-pass filter and the Q low-pass filter are changed based on the signal level of the adjacent waves detected by the adjacent wave detecting means, e.g., the presence of the adjacent waves, the interference by the adjacent channels can be reduced, the deterioration in the receiving sensitivity can be prevented and the receiving sensitivity can be improved, and also the tolerance for the frequency offset of the oscillation frequency of the local oscillator relative to the carrier frequency of the received signal can be improved.

In a direct converting receiver, the first electric field strength detecting means receives outputs of the first I low-pass filter and the first Q low-pass filter and then detects the signal level of the received signal, and the second electric field strength detecting means receives outputs of the second I low-pass filter and the second Q low-pass filter and then detects the signal level of the received signal.

Since the first electric field strength detecting means and the second electric field strength detecting means receives the outputs of the I low-pass filter and the Q low-pass filter and then detects the signal level of the received signal, a detection efficiency can be improved in detecting the electric field strength.

In a direct converting receiver, the adjacent wave detecting means receives outputs of the first electric field strength detecting means and the second electric field strength detecting means, and then generates a signal indicating the magnitude of the adjacent wave by comparing signal levels of these input signals.

The magnitude of the adjacent waves, e.g., a signal indicating whether or not the adjacent waves are contained can be detected by comparing two signal levels by using the adjacent wave detecting means based on the outputs of the first electric field strength detecting means and the second electric field strength detecting means, and the cut-off frequencies of the first I low-pass filter and the first Q low-pass filter can be changed according to this signal. As a result, the influence of the adjacent waves can be reduced, and also the tolerance for the frequency offset of the oscillation frequency of the local oscillator relative to the carrier frequency of the received signal can be enhanced.

In a direct converting receiver, the first I low-pass filter and the first Q low-pass filter have a cut-off frequency modifying means respectively, and the baseband filter controlling means outputs a filter controlling signal, which variably controls the cut-off frequencies of the first I low-pass filter and the first Q low-pass filter, based on the output signal of the adjacent wave detecting means, and then changes cut-off frequencies of the first I low-pass filter and the first Q low-pass filter discretely or continuously according to the filter controlling signal.

The filter controlling signal can be output from the baseband filter controlling means to control the cut-off frequency modifying means for the first I low-pass filter and the first Q low-pass filter, so that the cut-off frequencies of these low-pass filters can be changed discretely or continuously. As a result, the influence of the adjacent waves can be reduced, and also the tolerance for the frequency offset of the oscillation frequency of the local oscillator relative to the carrier frequency of the received signal can be enhanced.

According to third aspect of the present invention, a direct converting receiver comprises a local oscillator for generating a local signal; a first signal mixer for mixing a modulated signal based on a received signal with the local signal; a second signal mixer for mixing the modulated signal with a signal which is obtained by phase-shifting the local signal by 90 degree; an I low-pass filter for extracting an I baseband signal by eliminating a high frequency component of an output signal of the first signal mixer; a Q low-pass filter for extracting a Q baseband signal by eliminating a high frequency component of an output signal of the second signal mixer; a demodulating means for generating a demodulated signal of the received signal by processing the I baseband signal and the Q baseband signal; an electric field strength detecting means for detecting a signal level of the received signal based on at least one of outputs of the I low-pass filter and the Q low-pass filter; an electric field strength holding means for holding signal levels detected by the electric field strength detecting means under a condition that the I low-pass filter and the Q low-pass filter are set to have at least two different cut-off frequencies; an adjacent wave detecting means for detecting a signal level of the adjacent wave based on an output of the electric field strength holding means; and a baseband filter controlling means for variably controlling cut-off frequencies of the I low-pass filter and the Q low-pass filter according to an output signal of the adjacent wave detecting means.

In the direct converting, if the cut-off frequencies of the I low-pass filter and the Q low-pass filter are changed based on the signal level of the adjacent waves detected by the adjacent wave detecting means, e.g., the presence of the adjacent waves, the interference by the adjacent channels can be reduced, the deterioration in the receiving sensitivity can be prevented and the receiving sensitivity can be improved, and also the tolerance for the frequency offset of the oscillation frequency of the local oscillator relative to the carrier frequency of the received signal can be improved.

A direct converting further comprises an operation controlling means for controlling a setting of the cut-off frequencies of the I low-pass filter and the Q low-pass filter when an electric field strength is detected by the electric field strength detecting means and also a signal holding timing in the electric field strength holding means.

In the direct converting, the signal level of the received signal in a plurality of different frequency bands can be detected by controlling the electric field strength detecting means and the electric field strength detecting means by using the operation controlling means and then the magnitude of the adjacent waves can be detected based on the signal level, so that the cut-off frequencies of the I low-pass filter and the Q low-pass filter can be according to the magnitude of the adjacent waves. As a result, the influence of the adjacent waves can be reduced, and also the tolerance for the frequency offset of the oscillation frequency of the local oscillator relative to the carrier frequency of the received signal can be enhanced.

In a direct converting, the electric field strength detecting means receives outputs of the I low-pass filter and the Q low-pass filter, and then detects a signal level of the received signal.

Since the first electric field strength detecting means and the second electric field strength detecting means receives the outputs of the I low-pass filter and the Q low-pass filter and then detects the signal level of the received signal, a detection efficiency can be improved in detecting the electric field strength.

In a direct converting, the adjacent wave detecting means receives at least two outputs of the electric field strength holding means and then generates a signal indicating a magnitude of the adjacent wave by comparing signal levels of input signals in these different frequency bands.

The magnitude of the adjacent waves, e.g., a signal indicating whether or not the adjacent waves are contained can be detected by comparing signal levels in different frequency bands by using the adjacent wave detecting means based on at least two outputs from the electric field strength detecting means, and the cut-off frequencies of the I low-pass filter and the Q low-pass filter can be changed according to this signal. As a result, the influence of the adjacent waves can be reduced, and also the tolerance for the frequency offset of the oscillation frequency of the local oscillator relative to the carrier frequency of the received signal can be enhanced.

In a direct converting, the I low-pass filter and the Q low-pass filter have a cut-off frequency modifying means respectively, and the baseband filter controlling means outputs a filter controlling signal, which variably controls cut-off frequencies of the I low-pass filter and the Q low-pass filter, based on the output signal of the adjacent wave detecting means, and then changes the cut-off frequencies of the I low-pass filter and the Q low-pass filter discretely or continuously according to the filter controlling signal.

The filter controlling signal can be output from the baseband filter controlling means to control the cut-off frequency modifying means for the I low-pass filter and the Q low-pass filter, so that the cut-off frequencies of these low-pass filters can be changed discretely or continuously. As a result, the influence of the adjacent waves can be reduced, and also the tolerance for the frequency offset of the oscillation frequency of the local oscillator relative to the carrier frequency of the received signal can be enhanced.

DESCRIPTION OF THE PREFERRED EMBODIMENTS

Embodiments of the present invention will be explained with reference to the accompanying drawings hereinafter. A direct converting receiver according to the embodiments of the present invention is applied to a receiving means which is provided in a mobile communication device such as a personal handy phone, a mobile telephone, a pager, etc.

[First Embodiment]

Figure 1:
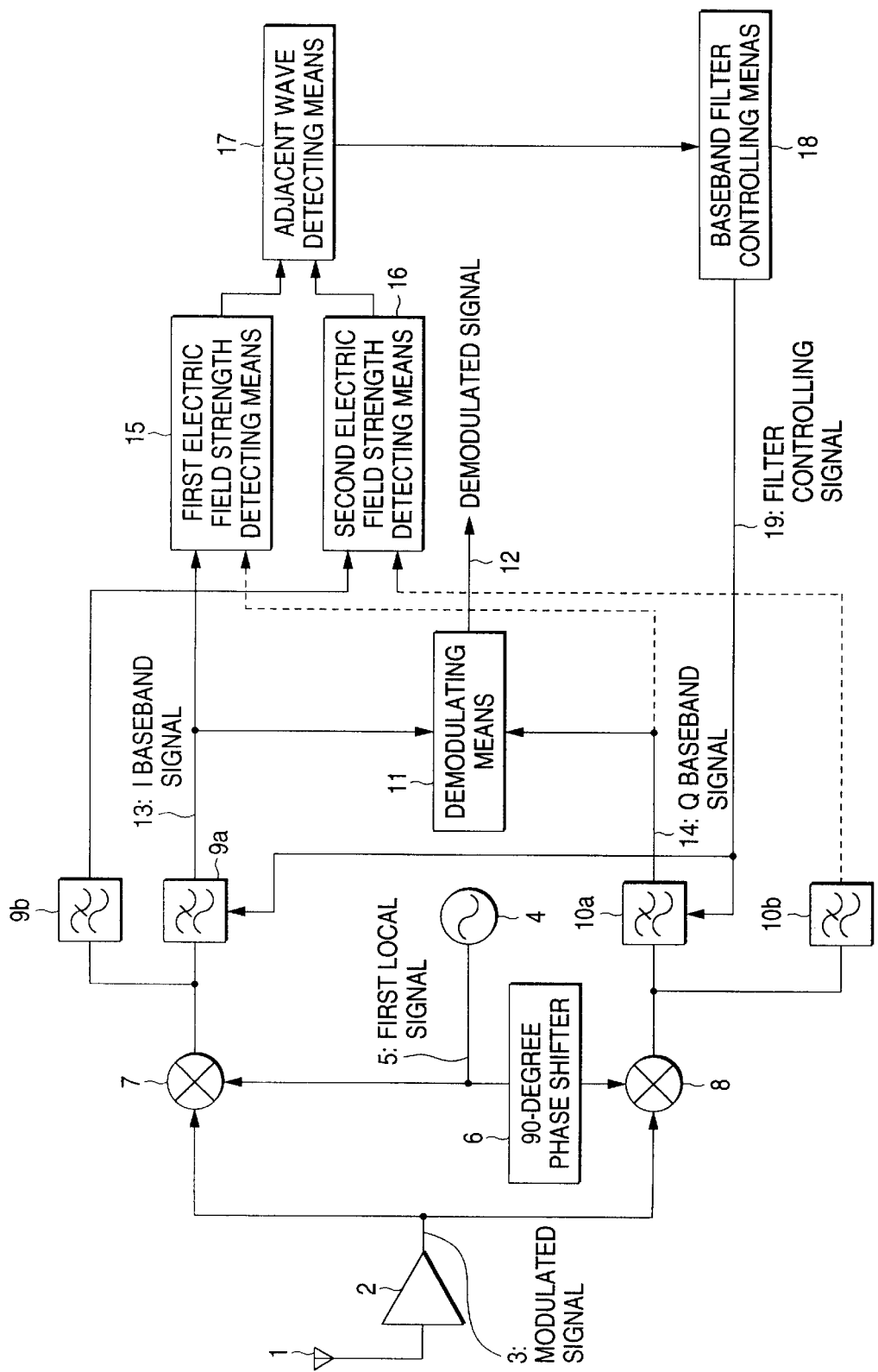
FIG. 1 is a block diagram showing a main configuration of a receiver circuit of a direct converting receiver according to a first embodiment of the present invention.
Figure 2:
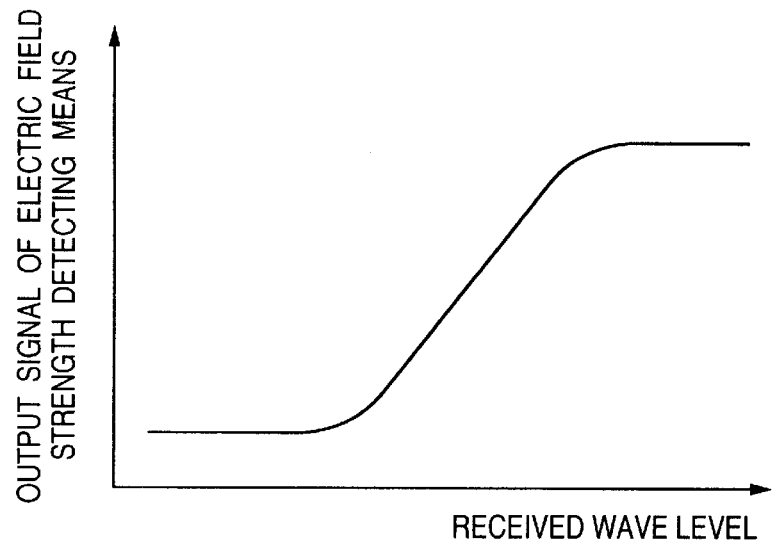
FIG. 2 is a view showing an output characteristic curve of first and second electric field strength detecting means.
Figure 3:
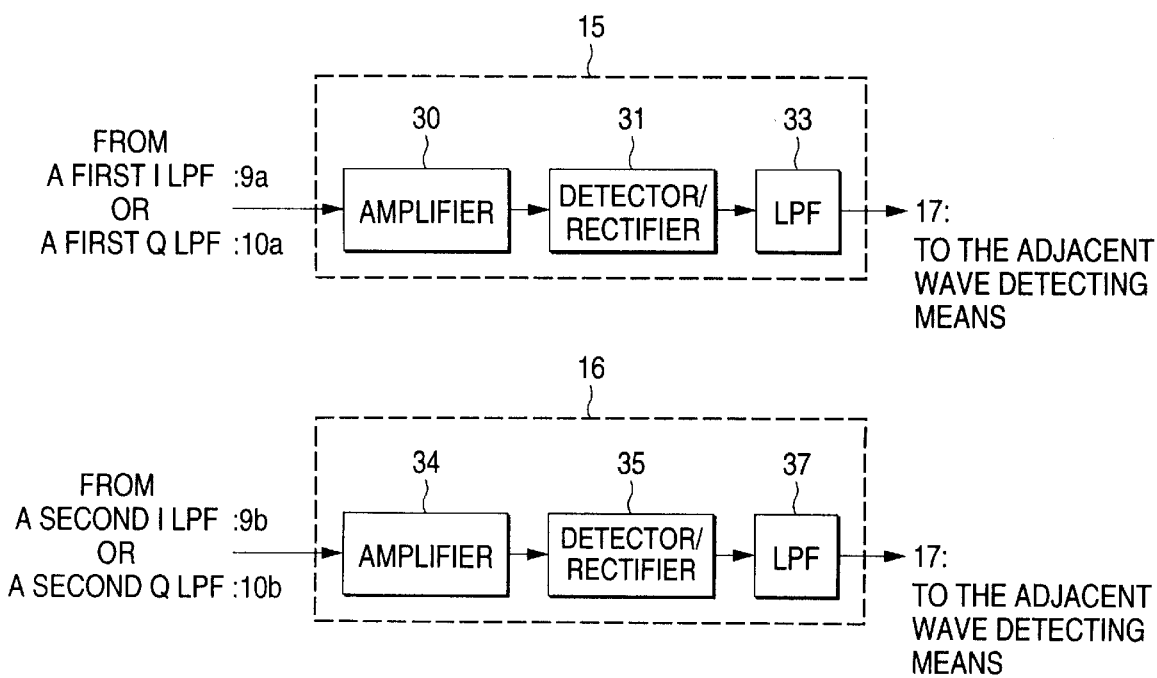
FIG. 3 is a block diagram showing a first example of the electric field strength detecting means.
Figure 4:
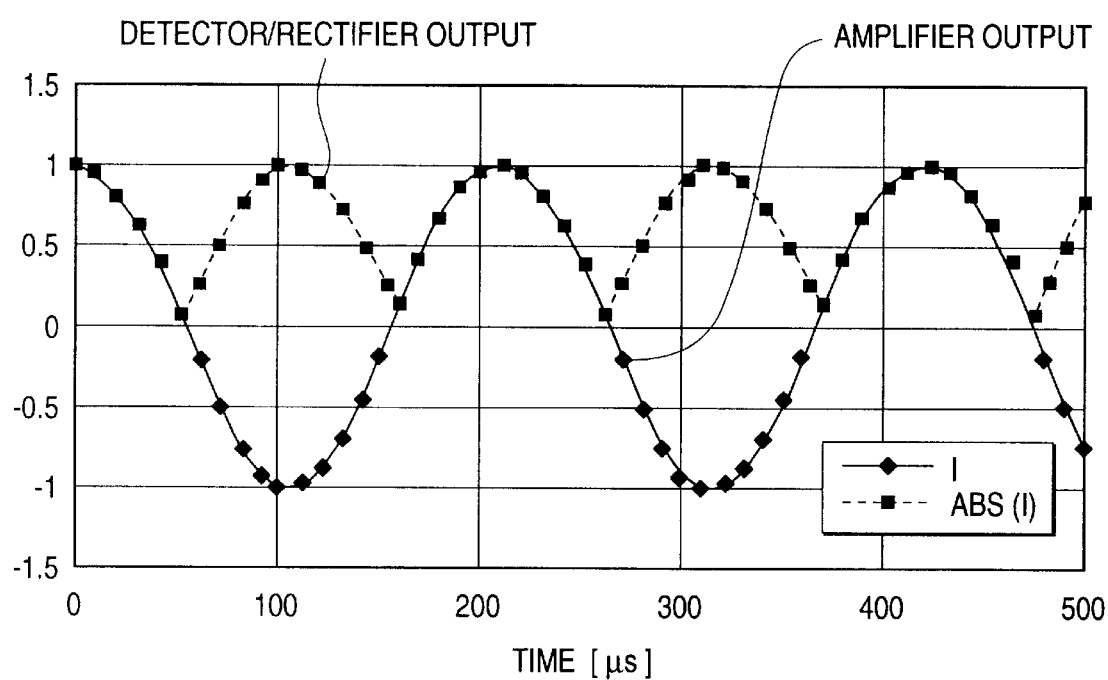
FIG. 4 is a view showing an output waveform in the electric field strength detecting means in the first example in FIG. 3.
Figure 5:
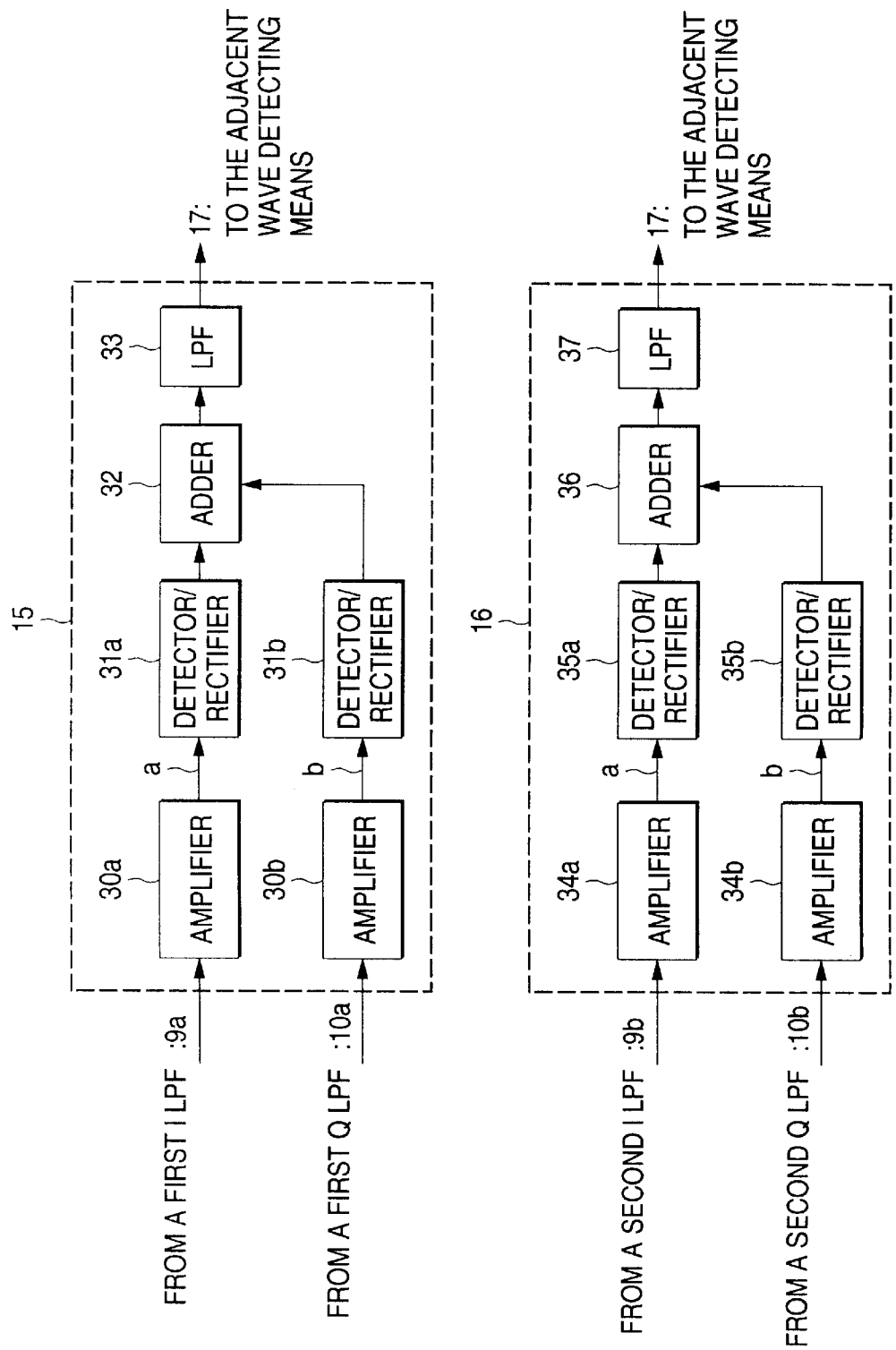
FIG. 5 is a block diagram showing a second example of the electric field strength detecting means.
Figure 6:
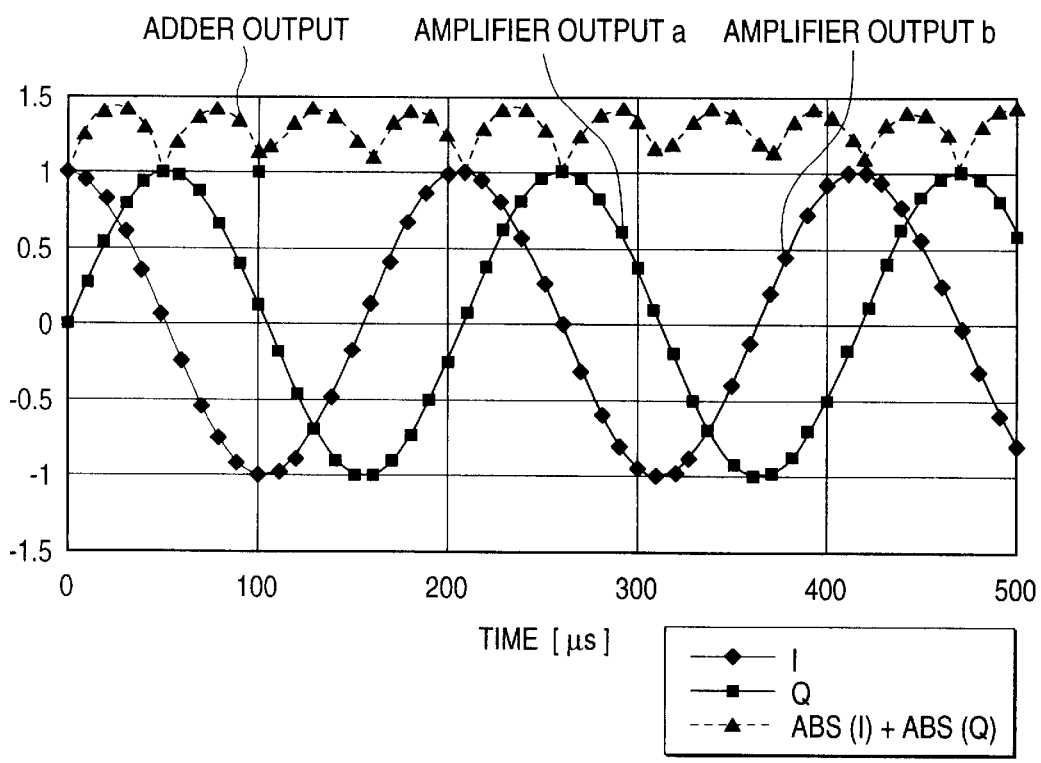
FIG. 6 is a view showing an output waveform in the electric field strength detecting means in the second example in FIG. 5.
Figure 7:
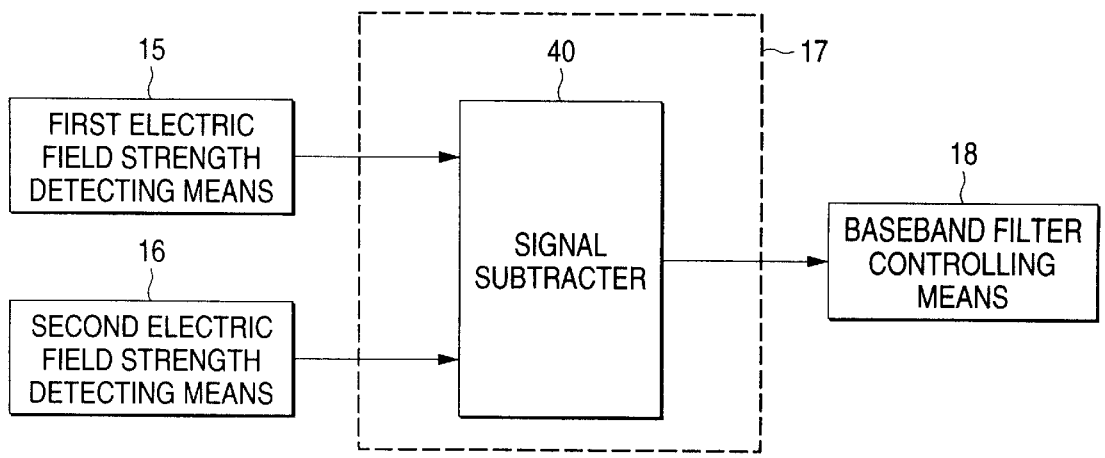
FIG. 7 is a block diagram showing a configuration of an adjacent wave detecting means.
Figure 8:
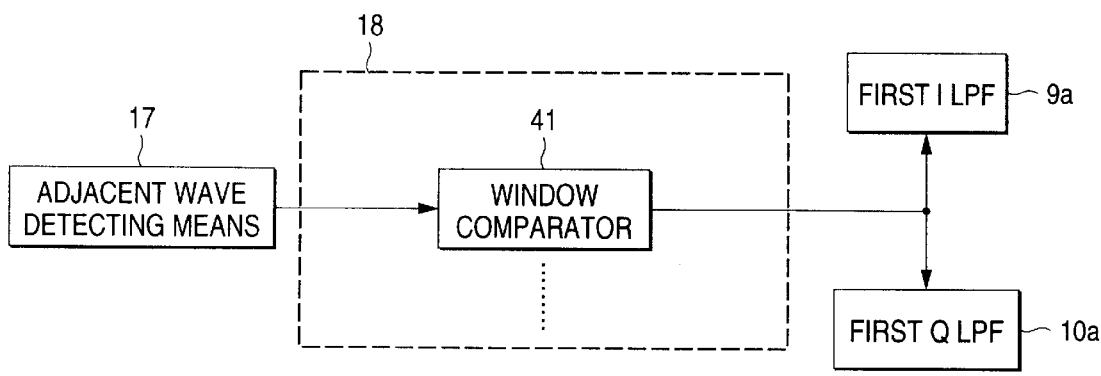
FIG. 8 is a block diagram showing a first example of a baseband filter controlling means.
Figure 9:
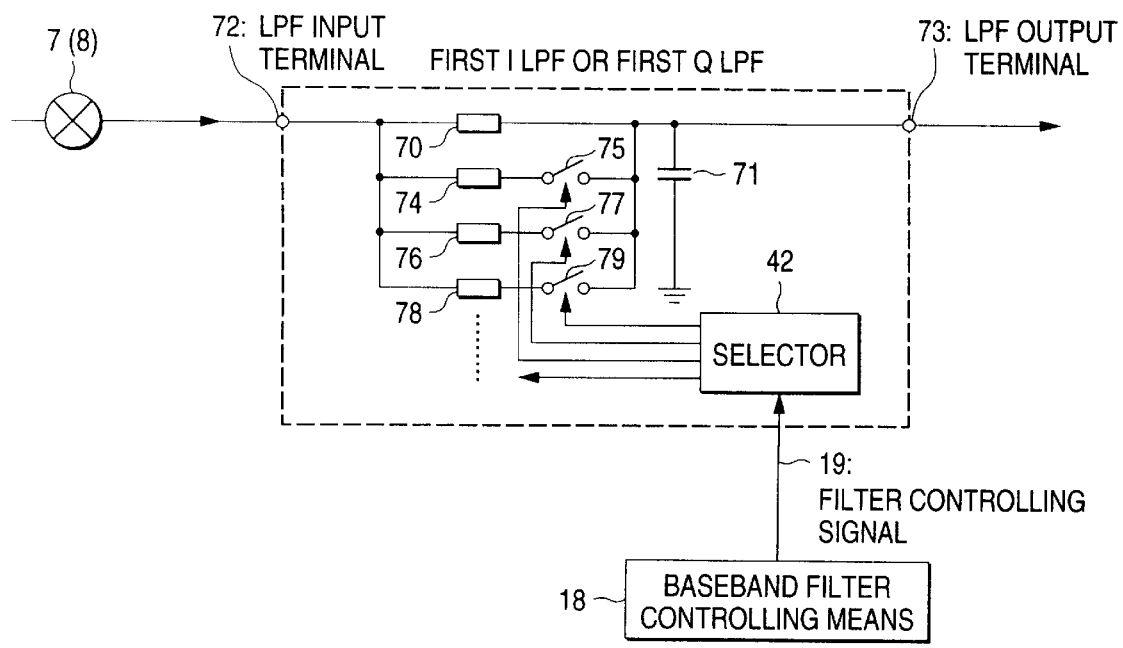
FIG. 9 is a block diagram showing a first example of a low-pass filter which corresponds to the first example in FIG. 8.
Figure 10:
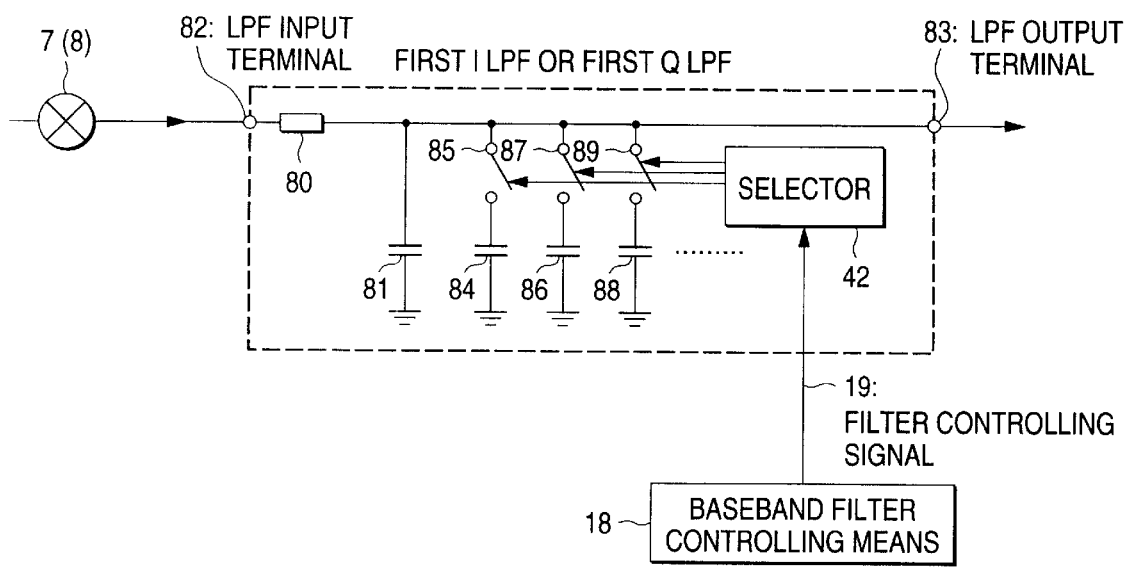
FIG. 10 is a block diagram showing a second example of the low-pass filter which corresponds to the first example in FIG. 8.
Figure 11:
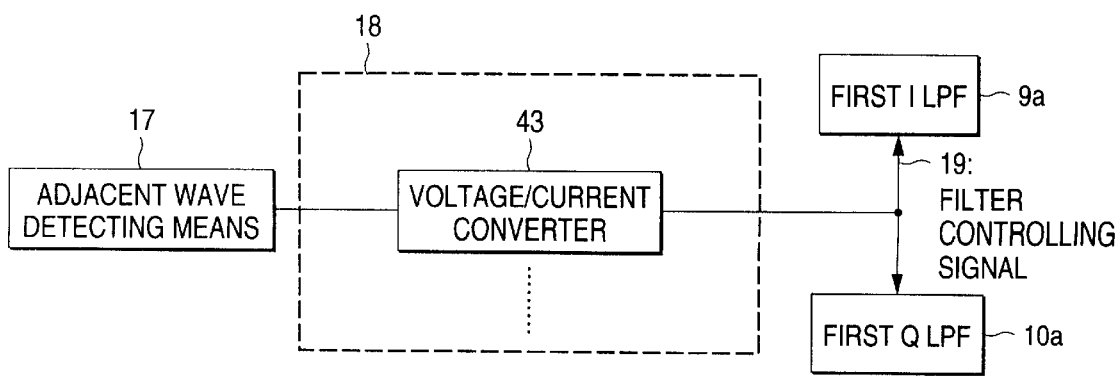
FIG. 11 is a block diagram showing a second example of the baseband filter controlling means.
Figure 12:
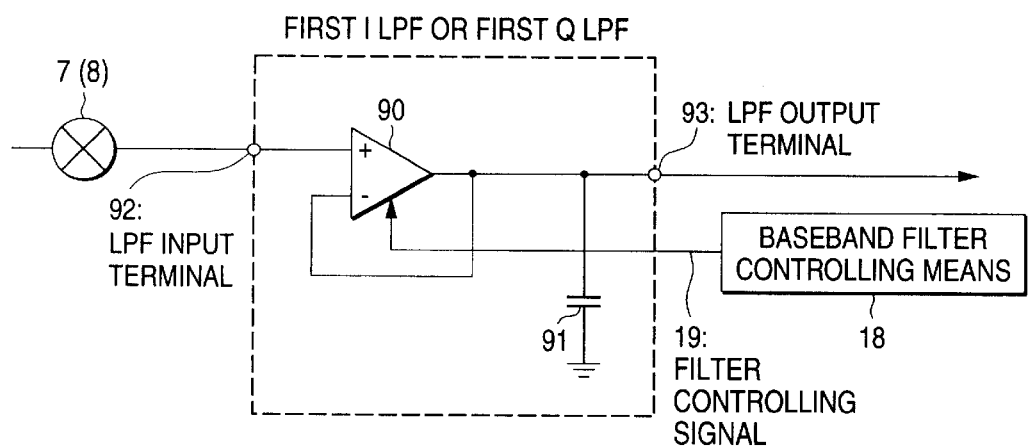
FIG. 12 is a block diagram showing a configuration of the low-pass filter which corresponds to the second example in FIG. 11.
Figure 13:
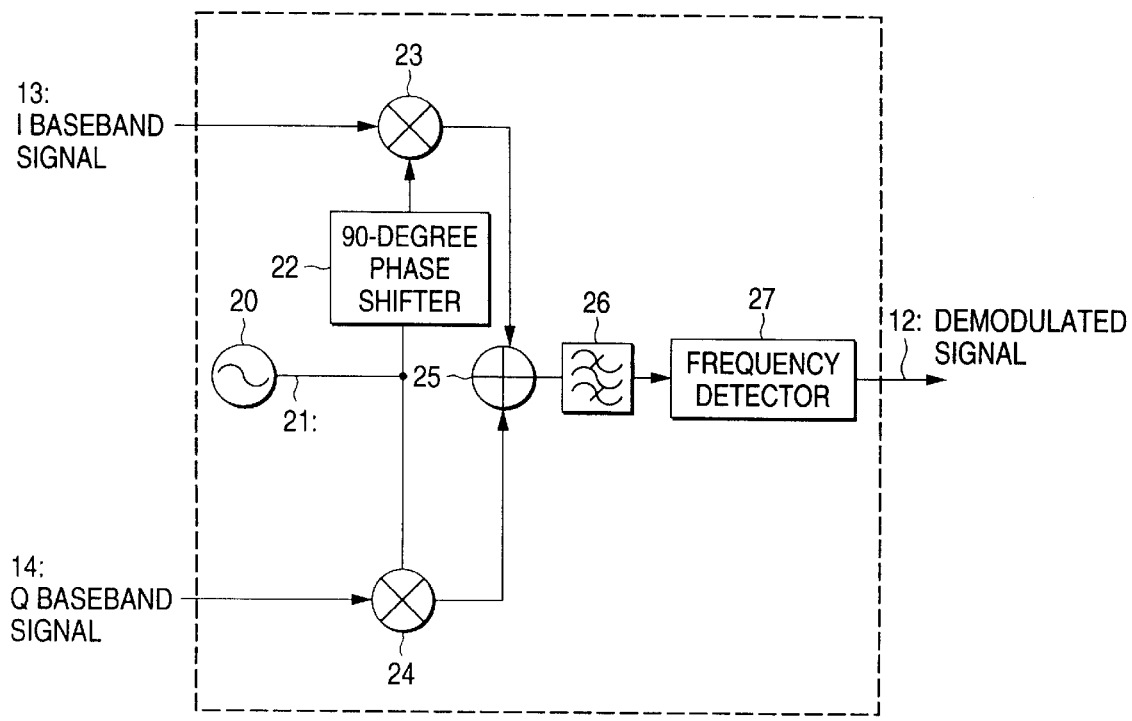
FIG. 13 is a block diagram showing a configuration of a demodulating means.

FIG. 1 is a block diagram showing a main configuration of a receiver circuit of a direct converting receiver according to a first embodiment of the present invention. FIG. 2 is a view showing an output characteristic curve of first and second electric field strength detecting means. FIG. 3 is a block diagram showing a first example of the electric field strength detecting means. FIG. 4 is a view showing an output waveform in the electric field strength detecting means in the first example in FIG. 3. FIG. 5 is a block diagram showing a second example of the electric field strength detecting means. FIG. 6 is a view showing an output waveform in the electric field strength detecting means in the second example in FIG. 5. FIG. 7 is a block diagram showing a configuration of an adjacent wave detecting means. FIG. 8 is a block diagram showing a first example of a baseband filter controlling means. FIG. 9 is a block diagram showing a first example of a low-pass filter which corresponds to the first example in FIG. 8. FIG. 10 is a block diagram showing a second example of the low-pass filter which corresponds to the first example in FIG. 8. FIG. 11 is a block diagram showing a second example of the baseband filter controlling means. FIG. 12 is a block diagram showing a configuration of the low-pass filter which corresponds to the second example in FIG. 11. FIG. 13 is a block diagram showing a configuration of a demodulating means.

As shown in FIG. 1, the direct converting receiver according to the first embodiment is constructed to comprise a receiving antenna 1 for receiving a radio signal, a received signal amplifier 2 for amplifying the received signal supplied from the receiving antenna 1 and outputting the amplified signal as a modulated signal 3, a first local oscillator 4 for generating a first local signal 5 whose frequency is substantially equal to a carrier frequency of the transmitted wave being received, a 90-degree phase shifter 6 for shifting a phase of the first local signal 5 by 90 degree, a first signal mixer 7 for mixing the modulated signal 3 with the first local signal 5, and a second signal mixer 8 for mixing the modulated signal 3 with a signal which is obtained by phase-shifting the first local signal 5 by 90 degree.

Further, in the direct converting receiver according to the first embodiment, there are provided a first I low-pass filter 9a for extracting a modulated component to be received from an output signal of the first signal mixer 7 and then outputting an I baseband signal 13, a second I low-pass filter 9b having a fixed cut-off frequency which is different from the low-frequency cut-off frequency of the first I low-pass filter 9a, a first Q low-pass filter 10a for extracting a modulated component to be received from an output signal of the second signal mixer 8 and then outputting a Q baseband signal 14 which is intersected orthogonally with the I baseband signal 13, and a second Q low-pass filter 10b having a fixed cut-off frequency which is different from the low-frequency cut-off frequency of the first Q low-pass filter 10a. The first I low-pass filter 9a and the first Q low-pass filter 10a are constructed to have a cut-off frequency modifying means which is able to modify a cut-off frequency based on a filter controlling signal 19 being output from a baseband filter controlling means 18 described later.

Furthermore, in the direct converting receiver according to the first embodiment, there are provided a demodulating means 11 for receiving the I baseband signal 13 output from the first I low-pass filter 9a and the Q baseband signal 14 output from the first Q low-pass filter 10a, then detecting them, and then demodulating them to output a demodulated signal 12, a first electric field strength detecting means 15 for receiving at least one of outputs of the first I low-pass filter 9a and the first Q low-pass filter 10a and then outputting a signal level of the received signal, a second electric field strength detecting means 16 for receiving at least one of outputs of the second I low-pass filter 9b and the second Q low-pass filter 10b and then outputting a signal level of the received signal, an adjacent wave detecting means 17 for receiving outputs of the first electric field strength detecting means 15 and the second electric field strength detecting means 16 and then detecting a signal level of the adjacent wave, and a baseband filter controlling means 18 for receiving an output signal of the adjacent wave detecting means 17 and then outputting a filter controlling signal 19 to modify the cut-off frequency of the first I low-pass filter 9a and the first Q low-pass filter 10a.

In turn, a receiving operation of the direct converting receiver constructed as above according to the first embodiment will be explained hereunder. To begin with, the radio signal caught by the receiving antenna 1 is then amplified by the received signal amplifier 2, and then output to the first signal mixer 7 and the second signal mixer 8 as the modulated signal 3. Meanwhile, the first local signal 5 generated from the first local oscillator 4 is mixed with the modulated signal 3 in the first signal mixer 7 and then output to the first I low-pass filter 9a. At the same time, the first local signal 5 is phase-shifted by the 90-degree phase shifter 6 by 90 degree, then mixed with the modulated signal 3 by the second signal mixer 8, and then output to the first Q low-pass filter 10a.

The output of the first signal mixer 7 is also output to the second I low-pass filter 9b which has the cut-off frequency different from the first I low-pass filter 9a. The output of the second signal mixer 8 is also output to the second Q low-pass filter 10b which has the cut-off frequency different from the first Q low-pass filter 10a.

The first I low-pass filter 9a changes its cut-off frequency under control of the filter controlling signal 19 which is output from the baseband filter controlling means 18, then eliminates the high frequency component from the output signal of the first signal mixer 7 to extract only the low frequency component including the modulated component necessary for a receiving operation, i.e., the baseband signal, and then outputs the I baseband signal 13 in a low frequency band. Similarly, the first Q low-pass filter 10a changes its cut-off frequency under control of the filter controlling signal 19 which is output from the baseband filter controlling means 18, then eliminates the high frequency component from the output signal of the second signal mixer 8 to extract only the low frequency component including the modulated component necessary for the receiving operation, i.e., the baseband signal, and then outputs the Q baseband signal 14, which is intersected orthogonally with the I baseband signal 13, in a low frequency band.

Then, the demodulating means 11 receives the I baseband signal 13 and the Q baseband signal 14, which are extracted via the first I low-pass filter 9a and the first Q low-pass filter 10a respectively, and then generates the demodulated signal 12 by the detection and demodulation to output it.

At that time, the first electric field strength detecting means 15 receives at least one of outputs of the first I low-pass filter 9a and the first Q low-pass filter 10a as an input signal, and then outputs the signal level of the received signal within the passbands of the first I low-pass filter 9a and the first Q low-pass filter 10a (referred to as "received wave level" hereinafter). Also, the second electric field strength detecting means 16 receives at least one of outputs of the second I low-pass filter 9b and the second Q low-pass filter 10b as an input signal, and then outputs the received wave level of the received signal within the passbands of the second I low-pass filter 9b and the second Q low-pass filter 10b.

In general, as shown in FIG. 2, it has been known that the first electric field strength detecting means 15 and the second electric field strength detecting means 16 have an input-output characteristic in which, as the received wave level which is input into the electric field strength detecting means is enhanced, their output signals are also increased.

Then, configurations and operations of the first electric field strength detecting means 15 and the second electric field strength detecting means 16 will be explained with reference to FIGS. 3 to 5 hereunder.

FIG. 3 shows the first example of the electric field strength detecting means. The first electric field strength detecting means 15 comprises an amplifier 30, a detector/rectifier 31, and a low-pass filter 33. In this configuration, the output signal of the first I low-pass filter 9a or the first Q low-pass filter 10a is amplified by the amplifier 30. Then, a signal output supplied from the amplifier 30 is detected and rectified by the detector/rectifier 31. Lastly, an output signal of the detector/rectifier 31 is integrated (averaged) by the low-pass filter 33 to get a direct current component of the output signal. This direct current component represents an average power in the passband of the first I low-pass filter 9a or the first Q low-pass filter 10a, and is output to the adjacent wave detecting means 17. FIG. 4 shows the operational waveform in such first example of the electric field strength detecting means. In FIG. 4, an output waveform of the signal amplified by the amplifier 30 and an output signal of the detector/rectifier 31 are shown as an amplifier output and an detector/rectifier output respectively.

Similarly, the second electric field strength detecting means 16 comprises an amplifier 34, a detector/rectifier 35, and a low-pass filter 37. In this case, the input signal is an output signal of a second I low-pass filter 9b or a second Q low-pass filter 10b. An output signal of the low-pass filter 37 represents an average power within the passband of the second I low-pass filter 9b or the second Q low-pass filter 10b.

FIG. 5 shows the second example of the electric field strength detecting means. The first electric field strength detecting means 15 comprises amplifiers 30a, 30b, detector/rectifiers 31a, 31b, an adder 32, and the low-pass filter 33. In this configuration, the output signal of the first I low-pass filter 9a is amplified by the amplifier 30a, and the output signal of the first Q low-pass filter 10a is amplified by the amplifier 30b. Then, signals output from the amplifiers 30a, 30b are detected and rectified by the detector/rectifiers 31a, 31b respectively. Then, the adder 32 adds output signals from the detector/rectifiers 31a, 31b and then outputs an added signal to the low-pass filter 33. In the last, an output signal of the adder 32 is integrated (averaged) by the low-pass filter 33 to get the direct current component of the output signal. This direct current component represents an average power in the passbands of the first I low-pass filter 9a and the first Q low-pass filter 10a, and is output to the adjacent wave detecting means 17. FIG. 6 shows the operational waveform in such second example of the electric field strength detecting means. In FIG. 6, output signals a, b of the amplifiers 30a, 30b and an output signal of the adder 32 are shown as an amplifier output a and an amplifier output b and an adder output respectively.

Similarly, the second electric field strength detecting means 16 comprises amplifiers 34a, 34b, detector/rectifiers 35a, 35b, an adder 36, and the low-pass filter 37. In this case, the input signals are output signals of the second I low-pass filter 9b and the second Q low-pass filter 10b. An output signal of the low-pass filter 37 represents an average power within the passbands of the second I low-pass filter 9b and the second Q low-pass filter 10b.

In this second example of the electric field strength detecting means, the signals input into the first electric field strength detecting means 15 and the second electric field strength detecting means 16 respectively are the mutually orthogonal signals, as shown by the amplifier outputs a, b of the amplifiers 30a, 30b in FIG. 6. As a result, if it is considered as the adder output, a detector efficiency can be improved rather than the first example of the electric field strength detecting means.

Next, the configuration of the adjacent wave detecting means 17 is shown in FIG. 7. The adjacent wave detecting means 17 is constructed to have a signal subtracter 40, and detects a signal level of the interference wave from adjacent channels, i.e., the adjacent wave based on the outputs of the first electric field strength detecting means 15 and the second electric field strength detecting means 16. In the first embodiment, the presence of the adjacent wave can be detected depending upon whether or not the interference wave exceeds a predetermined signal level. The signal subtracter 40 is constructed to calculate a difference in the signal level between the output signal of the first electric field strength detecting means 15 and the output signal of the second electric field strength detecting means 16, and then output it to the baseband filter controlling means 18.

In the first embodiment of the present invention, based on the advanced radio paging system standard (RCR STD-43) employed in the pager, the low-frequency cut-off frequencies of the first I low-pass filter 9a and the first Q low-pass filter 10a are set to 10 KHz, and the low-frequency cut-off frequencies of the second I low-pass filter 9b and the second Q low-pass filter 10b are set to 35 KHz. A channel interval is set to 25 KHz. In case the adjacent wave is present and contained in the received signal, the second I low-pass filter 9b and the second Q low-pass filter 10b pass the adjacent wave, nevertheless the first I low-pass filter 9a and the first Q low-pass filter 10a do not pass the adjacent wave. As a result, the output signal of the second electric field strength detecting means 16 becomes larger than that of the first electric field strength detecting means 15. Hence, if signal levels of these output signals are compared with each other to detect the difference therebetween, it is possible to detect whether or not the adjacent wave is contained in the received signal.

Then, configurations and operations of the baseband filter controlling means 18, the first I low-pass filter 9a, and the first Q low-pass filter 10a will be explained with reference to FIGS. 8 to 12 hereinbelow.

The baseband filter controlling means 18 generates a filter controlling signal 19 based on the output signal of the adjacent wave detecting means 17, and then outputs it. The filter controlling signal 19 switches and controls the cut-off frequencies of the first I low-pass filter 9a and the first Q low-pass filter 10a.

FIG. 8 shows the first example of the baseband filter controlling means 18. The baseband filter controlling means 18 in the first example is constructed to have a window comparator 41. If the input signal from the adjacent wave detecting means 17 is within a predetermined range which is set previously, the window comparator 41 outputs a high level (or low level) as the filter controlling signal 19 to the first I low-pass filter 9a and the first Q low-pass filter 10a. The first I low-pass filter 9a and the first Q low-pass filter 10a can change their cut-off frequencies according to this filter controlling signal 19.

Only one window comparator is employed in the example shown in FIG. 8. However, two window comparators or more which output the high level (or low level) in different input signal ranges may be employed. In this case, if output signals of respective comparators are decided by using logic circuits (logic gates such as AND gate, OR gate, or the like), it can be decided in a multi-stage range which regions the input signal from the adjacent wave detecting means 17 belongs to. As a result, it is possible to change the cut-off frequency in the multi-stage fashion (i.e., discretely) according to the decision result, i.e., the magnitude of the adjacent wave.

In practice, in the event that the adjacent wave has been detected in the setting based on the above-mentioned advanced radio paging system standard (RCR STD-43), if the low-frequency cut-off frequencies of the first I low-pass filter 9a and the first Q low-pass filter 10a are narrowed from 10 KHz to 8 KHz, the influence of the adjacent wave can be reduced with no influence upon the desired received signal to be received. In the event that the adjacent wave has not been detected, if the low-frequency cut-off frequencies of the first I low-pass filter 9a and the first Q low-pass filter 10a are widened from 8 KHz to 10 KHz, a tolerance of the frequency offset between the oscillation frequency of the first local oscillator 4 and the carrier frequency of the received signal can be set larger.

The examples of the first I low-pass filter 9a and the first Q low-pass filter 10a, which correspond to the first example of the above baseband filter controlling means 18, are shown in FIGS. 9 and 10. These examples have a cut-off frequency modifying means which can switch (change discretely) the cut-off frequency according to the above filter controlling signal 19.

FIG. 9 shows the first example of the first I low-pass filter 9a and the first Q low-pass filter 10a. The first I low-pass filter 9a and the first Q low-pass filter 10a are set such that their cut-off frequencies can be switched by changing a resultant resistance of resistor elements constituting these low-pass filters. This configuration of the low-pass filter has been known as a passive type low-pass filter. Thus, the first I low-pass filter 9a and the first Q low-pass filter 10a are called the "passive type low-pass filter" as a general term hereinafter.

The passive type low-pass filter is constructed to have a low-pass filter input terminal 72 connected to the first signal mixer 7 or the second signal mixer 8, resistor elements 70, 74, 76, 78 provided to be connected in parallel, switches 75, 77, 79 connected to the resistor elements 74, 76, 78 respectively, a capacitor element 71 whose one end is connected to the resistor element 70 and whose other end is connected to ground, a selector 42, and a low-pass filter output terminal 73 connected to the demodulating means 11, etc. One terminal of the resistor element 70 acts as the low-pass filter input terminal 72, and other terminal of the resistor element 70 also acts as the low-pass filter output terminal 73 to which one end of the capacitor element 71 and one ends of the switches 75, 77, 79 are connected.

The low frequency component of the input signal to the passive type low-pass filter is passed through based on constants of the resistor elements 70, 74, 76, 78 and the capacitor element 71. Then, the I baseband signal 13 or the Q baseband signal 14 is output from the low-pass filter output terminal 73. The selector 42 turns ON/OFF the switches 75, 77, 79 based on the filter controlling signal 19 output from the baseband filter controlling means 18. Here, a cut-off frequency modifying means is composed of the resistor elements 74, 76, 78, the switches 75, 77, 79, and the selector 42.

For instance, in case one window comparator 41 is employed in the baseband filter controlling means 18 in FIG. 8 and also the filter controlling signal 19 output from the baseband filter controlling means 18 is a binary signal at the high level or low level, the selector 42 in FIG. 9 controls at least one switch. In this case, if only the switch 75 is changed from OFF to ON (remaining switches are still OFF entirely), the resistor element 74 is connected in parallel with the resistor element 70 and thus a resultant resistance as a low-pass filter is reduced. As a result, the cut-off frequency of the low-pass filter is increased. On the contrary, if the switch 75 is OFF (remaining switches are still OFF entirely), the resistor element 74 is disconnected from the resistor element 70. Hence, the resultant resistance as the low-pass filter is increased and thus the cut-off frequency of the low-pass filter is lowered. In this manner, the cut-off frequency of the passive type low-pass filter can be switched by changing the resultant resistance in the low-pass filter.

FIG. 10 shows the second example of the first I low-pass filter 9a and the first Q low-pass filter 10a. Although the resistor elements are switched by the switches in the first example in FIG. 9, the second example is constructed to switch capacitor elements in place of the resistor elements. This passive type low-pass filter comprises a low-pass filter input terminal 82 connected to the first signal mixer 7 or the second signal mixer 8, a resistor element 80, capacitor elements 81, 84, 86, 88 whose one ends are connected to the resistor element 80 and whose other ends are connected in parallel and grounded, switches 85, 87, 89 connected to these capacitor elements 84, 86, 88, a selector 43, and a low-pass filter output terminal 83 connected to the demodulating means 11, etc. Since an operational principle is similar to the above first example, detailed explanation will be omitted herein.

In the configuration in FIG. 9, the resistor elements are arranged in parallel and the switches are arranged in series with the resistor elements respectively. But, as another constituting method, the resistor elements are arranged in series and then the switches are arranged in parallel with the resistor elements respectively.

If one window comparator 41 or more are employed in the baseband filter controlling means 18 in FIG. 8, the baseband filter controlling means 18 can switch and control the switches in various combination in the selector 42 according to the multiplied (serial or parallel) filter controlling signal 19 by outputting such multiplied filter controlling signal 19 to the selector 42.

As the switches 75, 77, 79 (85, 87, 89) employed in this configuration, any switches may be employed, for example, if they can be employed in the IC circuit such as a transistor, etc. Although, as the configuration of the low-pass filter, an example of first degree passive type low-pass filter is mentioned in this example, any degree of the passive type low-pass filter may be employed if the degree of the filter is one or more. In addition, the low-pass filter may be constructed as an active type low-pass filter and also filters having various configurations are available.

FIG. 11 shows the second example of the baseband filter controlling means 18. The baseband filter controlling means 18 in the second example is constructed to have a voltage/current converter 43. As generally known, the voltage/current converter 43 converts a voltage of the output signal from the adjacent wave detecting means 17 into a current, and then outputs this current as the filter controlling signal 19 to the first I low-pass filter 9a and the first Q low-pass filter 10a. In the first I low-pass filter 9a and the first Q low-pass filter 10a which correspond to the baseband filter controlling means 18, if the cut-off frequency modifying means is constructed by using the gm amplifier which can change a resistance component (conductance gm) in proportion to the above converted current, the cut-off frequency can be changed continuously according to an amount of the interference wave in the adjacent channel.

FIG. 12 shows the third example of the first I low-pass filter 9a and the first Q low-pass filter 10a. The first I low-pass filter 9a and the first Q low-pass filter 10a correspond to the second example of the above baseband filter controlling means 18. The cut-off frequencies can be modified by changing continuously the values of the resistor elements which constitute the low-pass filter.

The low-pass filter in the third example is constructed to have a low-pass filter input terminal 92 connected to the first signal mixer 7 or the second signal mixer 8, a gm amplifier 90 composed of a well-known differential amplifier to change the resistance component (conductance gm) in proportion to the input current, a capacitor element 91 whose one end is connected to the gm amplifier 90 and whose other end is grounded, and a low-pass filter output terminal 93 connected to the demodulating means 11, etc. to output the I baseband signal 13 or the Q baseband signal 14.

In this configuration, according to the filter controlling signal 19 being output from the baseband filter controlling means 18 in the second example shown in FIG. 11, a collector current of the differential amplifier can be changed continuously, as shown by Eq.(1) in the following.

$$gm = Ic/(2 \times Vt) \quad (1)$$

Where Ic is a current flowing through the collector of the differential amplifier, and Vt is a thermal voltage (26 mV at room temperature).

If the conductance gm is changed according to the change in the collector current of the differential amplifier to change the resistor component equivalently, it is possible to change the cut-off frequency of the low-pass filter continuously.

In this configuration, an example of the first degree low-pass filter has been explained. But any order of the filter may be applied if it is one or more, and various configurations may be applied without limitation of filter type such as passive type, active type, etc.

Next, a configuration and an operation of the demodulating means 11 will be explained with reference to FIG. 13 hereunder. The demodulating means 11 is constructed to comprise a second local oscillator 20 for generating a second local signal 21, a 90-degree phase shifter 22 for shifting a phase of the second local signal 21 by 90 degree, a third signal mixer 23, a fourth signal mixer 24, a signal adder 25, a waveform shaping filter 26, and a frequency detector 27.

As described above, the I baseband signal 13 or the Q baseband signal 14 are intersected orthogonally with each other. The fourth signal mixer 24 mixes the second local signal 21, which is an output signal of the second local oscillator 20, with the Q baseband signal 14 and then output a mixed signal. Meanwhile, the third signal mixer 23 mixes a signal, which is generated by shifting a phase of the second local signal 21 by 90 degree, with the I baseband signal 13 and then output a mixed signal. Then, an output signal whose frequency is around the frequency of the second local signal 21 can be obtained by adding output signals of the third signal mixer 23 and the fourth signal mixer 24 in the signal adder 25.

If the modulated signal 3 being received has been subjected to the frequency shift keying (FSK), an output signal of the signal adder 25 is an FSK signal which receives the same frequency shift around the frequency of the second local signal 21, as described above. If an oscillation frequency of the second local oscillator 20 is set lower considerably than an oscillation frequency of the first local oscillator 4, a circuit configuration which makes IC fabrication easy can be implemented.

The waveform shaping filter 26 shapes the waveform by filtering the output signal from the signal adder 25 to pass only a frequency bandwidth in which the modulated signal whose frequency is centered at the frequency of the second local signal 21 is contained, and removing the high and low frequency components which are not contained in the frequency bandwidth. The frequency detector 27 receives the signal consisting of only the frequency bandwidth in which the modulated signal output from the waveform shaping filter 26 is contained, and then frequency-detects the signal.

As a result, the demodulating signal 12 can be derived. Any device may be employed as the frequency detector 27 if it can execute frequency demodulation such as pulse count demodulation, quadrature demodulation, etc.

As described above, in the first embodiment, the received wave level (average power of the received signal) within the passbands of the first I low-pass filter 9a and the first Q low-pass filter 10a is detected by the first electric field strength detecting means 15 and the second electric field strength detecting means 16, then it is detected by the adjacent wave detecting means 17 based on difference of the output signals of two electric field strength detecting means whether or not the adjacent waves (radio waves on the adjacent channels) are contained, and then the cut-off frequencies of the first low-pass filter 9a and the first Q low-pass filter 10a are modified and controlled depending upon whether or not the adjacent waves are contained. If it has been decided that the adjacent waves are contained, the baseband filter controlling means 18 outputs the filter controlling signal 19 based on the output signal from the adjacent wave detecting means 17 to lower the cut-off frequencies of the first I low-pass filter 9a and the first Q low-pass filter 10a, whereby the influence of the interference wave from the adjacent channels (i.e., adjacent waves) can be reduced. In contrast, if it has been decided that the adjacent waves are not contained, the baseband filter controlling means 18 outputs the filter controlling signal 19 based on the output signal from the adjacent wave detecting means 17 to raise the cut-off frequencies of the first I low-pass filter 9a and the first Q low-pass filter 10a, whereby tolerance for the frequency offset of the oscillation frequency of the first local oscillator 4 from the carrier frequency of the modulated signal 3 to be received can be improved.

As a consequence, deterioration in the receiving sensitivity due to the adjacent waves can be reduced if the adjacent waves are contained in the received signal, so that it is feasible to improve the receiving sensitivity by eliminating the harmful influence of the adjacent waves. In addition, the tolerance for the frequency offset of the oscillation frequency of the first local signal relative to the carrier frequency of the modulated signal to be received can be enhanced if the adjacent waves are not contained in the received signal, so that it is feasible to set larger an allowable amount of the frequency variation of the local oscillator which generates the local signal. As a result, the direct converting receiver which has a simple configuration without the deterioration in the receiving sensitivity can be constructed to thus achieve miniaturization and lower cost of the receiver.

[Second Embodiment]

Figure 14:
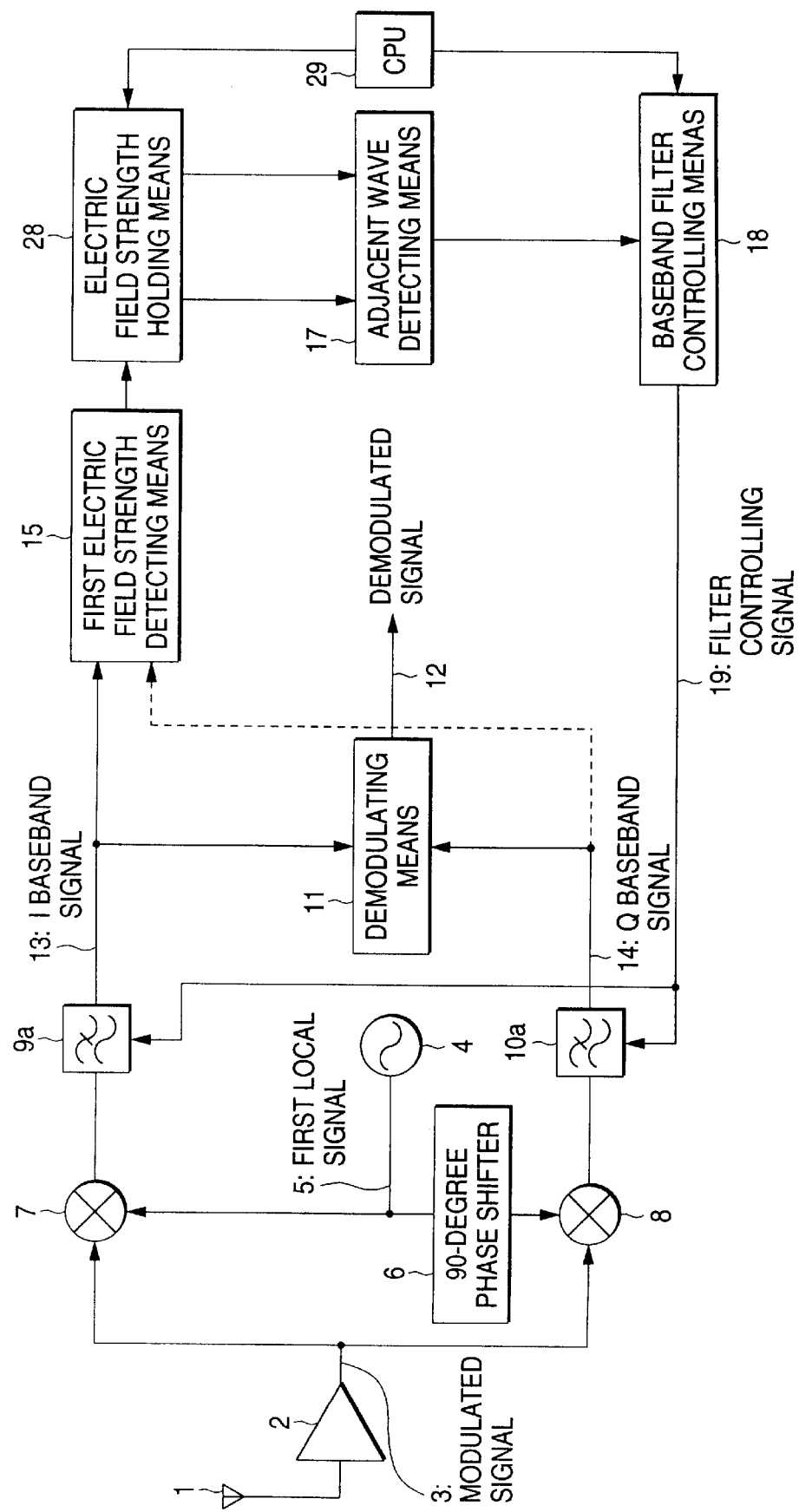
FIG. 14 is a block diagram showing a main configuration of a receiver circuit of a direct converting receiver according to a second embodiment of the present invention.
Figure 15:
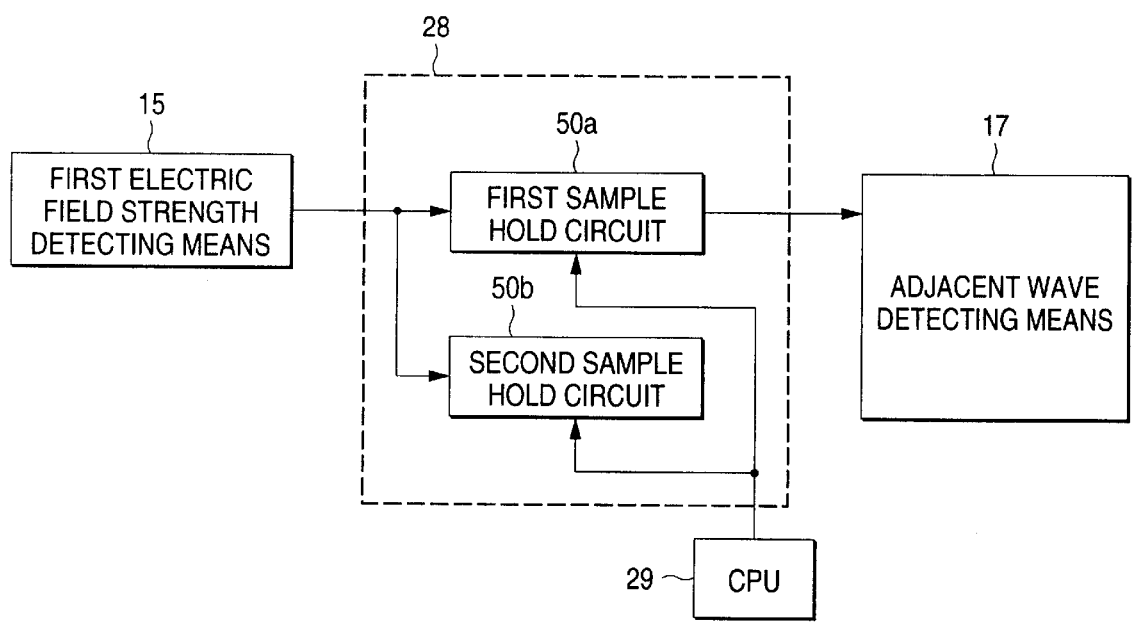
FIG. 15 is a block diagram showing a configuration of an electric field strength holding means.
Figure 16:
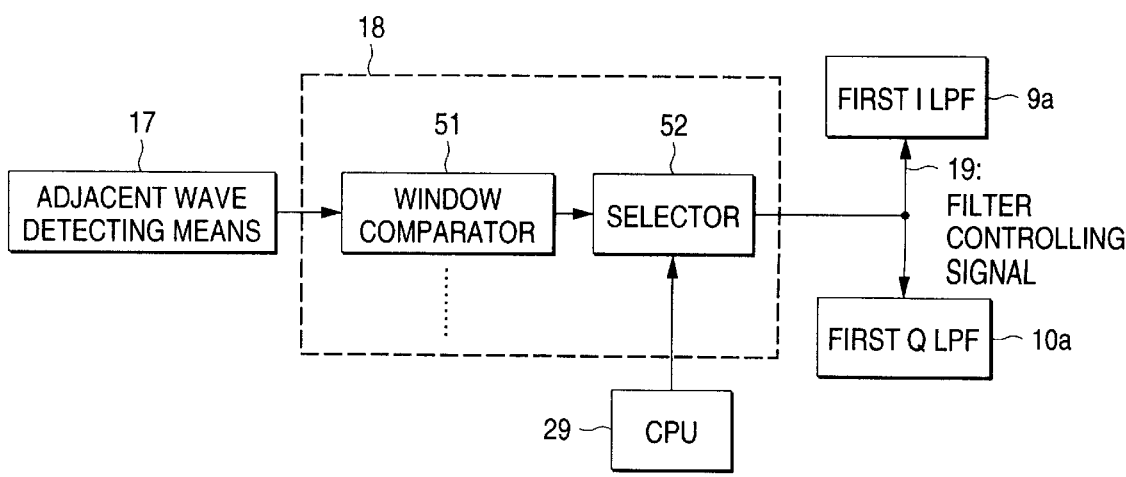
FIG. 16 is a block diagram showing a configuration of the baseband filter controlling means.
Figure 17:
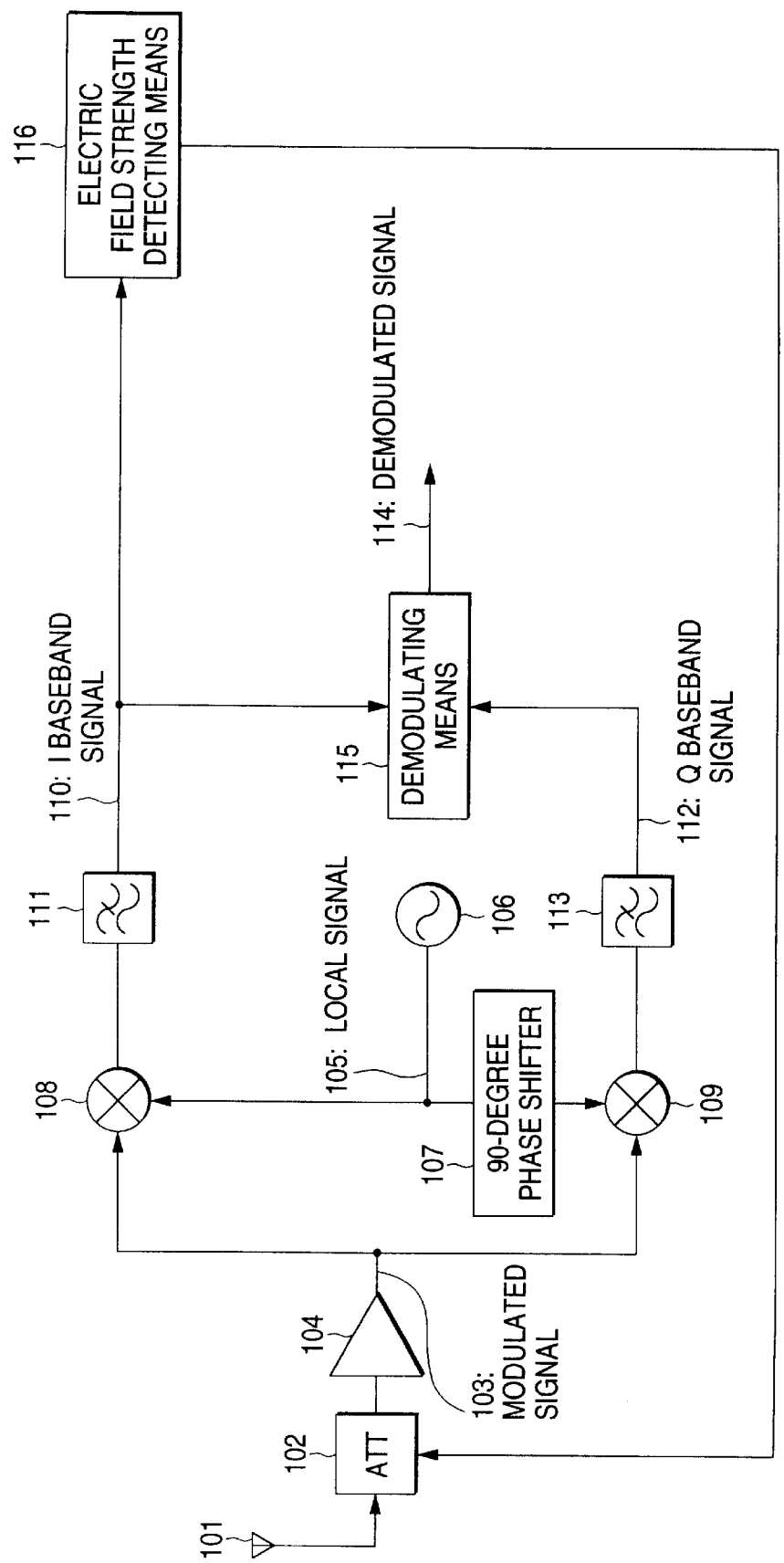
FIG. 17 is a block diagram showing a configuration of a receiver circuit of a direct converting receiver in the prior art.

FIG. 14 is a block diagram showing a main configuration of a receiver circuit of a direct converting receiver according to a second embodiment of the present invention. FIG. 15 is a block diagram showing a configuration of an electric field strength holding means. FIG. 16 is a block diagram showing a configuration of the baseband filter controlling means.

In the direct converting receiver according to the second embodiment, in place of the second electric field strength detecting means in the first embodiment shown in FIG. 1, an electric field strength holding means 28 and a CPU 29 are provided. Thus, the electric field strength holding means 28 and the baseband filter controlling means 18 are controlled by the CPU 29. Since other portions are similar substantially in configuration to those of the first embodiment, only different portions of the second embodiment will be explained herein.

The first electric field strength detecting means 15 receives the outputs of the first I low-pass filter 9a and the first Q low-pass filter 10a, and then outputs the received wave level of the received signal within the passband of the first I low-pass filter 9a and the first Q low-pass filter 10a. Then, the output signal of the first electric field strength detecting means 15 is input into the electric field strength holding means 28, and its holding timing is controlled by the CPU 29.

As shown in FIG. 15, the electric field strength holding means 28 is constructed to have a first sample hold circuit 50a and a second sample hold circuit 50b. The output signal of the first electric field strength detecting means 15 is input into the first sample hold circuit 50a and the second sample hold circuit 50b respectively. The first sample hold circuit 50a and the second sample hold circuit 50b sample-hold their input signals based on the control signal from the CPU 29 respectively to then output their held signals to the adjacent wave detecting means 17 individually. The adjacent wave detecting means 17 detects the presence of the adjacent waves according to level difference of the signal input from the electric field strength holding means 28, and then outputs a detected result to the baseband filter controlling means 18.

As shown in FIG. 16, the baseband filter controlling means 18 is constructed to have a window comparator 51 and a selector 52, and controls the low-frequency cut-off frequencies of the first I low-pass filter 9a and the first Q low-pass filter 10a based on the output signal of the adjacent wave detecting means 17 and the control signal output from the CPU 29. If the input signal from the adjacent wave detecting means 17 is within the predetermined range which has been set in advance, the window comparator 51 outputs a high level (or low level) signal to the selector 52. The selector 52 outputs the filter controlling signal 19 which can control the low-frequency cut-off frequencies of the first I low-pass filter 9a and the first Q low-pass filter 10a based on the output signal of the window comparator 51 and the control signal output from the CPU 29.

Only one window comparator is employed in the example shown in FIG. 16. However, two window comparators or more which output the high level (or low level) in different input signal ranges maybe employed. Thus, it is possible to change the cut-off frequency in the multi-stage fashion in compliance with the level of the adjacent wave.

Next, control of the CPU 29 in the second embodiment will be explained hereunder. At first, the CPU 29 sends the control signal to the baseband filter controlling means 18, and then causes the baseband filter controlling means 18 to set the low-frequency cut-off frequencies of the first I low-pass filter 9a and the first Q low-pass filter 10a to 10 KHz. In this state, the first electric field strength detecting means 15 detects the received wave level within the passbands of the first I low-pass filter 9a and the first Q low-pass filter 10a, and then outputs a detected result to the electric field strength holding means 28. In the electric field strength holding means 28, the first sample hold circuit 50a holds the output signal level from the first electric field strength detecting means 15 according to the control signal of the CPU 29, and then outputs the held signal to the adjacent wave detecting means 17.

Then, the CPU 29 sends the control signal to the baseband filter controlling means 18 and then causes the baseband filter controlling means 18 to set the low-frequency cut-off frequencies of the first I low-pass filter 9a and the first Q low-pass filter 10a to 35 KHz. In this state, the first electric field strength detecting means 15 detects the received wave level within the passbands of the first I low-pass filter 9a and the first Q low-pass filter 10a, and then outputs a detected result to the electric field strength holding means 28. In the electric field strength holding means 28, the second sample hold circuit 50b holds the output signal level from the first electric field strength detecting means 15 according to the control signal of the CPU 29, and then outputs the held signal to the adjacent wave detecting means 17.

Then, the adjacent wave detecting means 17 receives two signals held by the electric field strength holding means 28, then detects by comparing these signal levels whether or not the adjacent waves are contained therein, and then outputs a detected result to the baseband filter controlling means 18.

If the adjacent waves are contained therein, the baseband filter controlling means 18 changes the low-frequency cut-off frequencies of the first I low-pass filter 9a and the first Q low-pass filter 10a from 10 KHz to 8 KHz, based on the output signal of the adjacent wave detecting means 17 and the control signal from the CPU 29, to thus narrow their bandwidths. As a result, the influence of the adjacent waves can be reduced. On the contrary, if the adjacent waves are not detected, the low-frequency cut-off frequencies of the first I low-pass filter 9a and the first Q low-pass filter 10a are changed from 8 KHz to 10 KHz to widen their bandwidths. As a result, it is possible to expand an allowable range of the frequency offset of the oscillation frequency of the first local oscillator 4 from the carrier frequency of the received signal, i.e., to enhance the tolerance for the frequency offset of the oscillation frequency of the first local oscillator 4 with respect to the carrier frequency of the received signal.

As mentioned above, according to the second embodiment, like the foregoing first embodiment, the bad influence due to the adjacent waves can be reduced if the adjacent waves are contained. In addition, the tolerance for the frequency offset of the oscillation frequency of the first local signal relative to the carrier frequency of the modulated signal to be received can be enhanced if the adjacent waves are not contained. As a result, the direct converting receiver which has a simple configuration without the deterioration in the receiving sensitivity can be constructed to thus achieve miniaturization and lower cost of the receiver.

Moreover, in the second embodiment, the adjacent waves can be detected by using only one electric field strength detecting means (first electric field strength detecting means 15). As a result, reduction in circuit scale and reduction in power consumption can be achieved.

As discussed above, according to the present invention, in the direct converting receiver, such an advantage can be achieved based on the signal level of the adjacent waves detected by the adjacent wave detecting means, e.g., the presence of the adjacent waves that, if the cut-off frequencies of the low pass filters are varied so as to lower the cut-off frequencies of the I low-pass filter and the Q low-pass filter when an influence degree of the adjacent waves is large while to raise the cut-off frequencies of the I low-pass filter and the Q low-pass filter when the influence degree of the adjacent waves is small, the influence of the adjacent waves can be reduced and also the tolerance for the frequency offset of the oscillation frequency of the local signal with respect to the carrier frequency of the modulated signal to be received can be improved.

What is claimed is:

1. A direct converting receiver comprising:
   a local oscillator for generating a local signal;
   a first signal mixer for mixing the local signal with a modulated signal based on a received signal;
   a second signal mixer for mixing the modulated signal with a signal which is obtained by phase-shifting the local signal by 90 degree;
   an I low-pass filter for eliminating a high frequency component of an output signal of the first signal mixer;
   an Q low-pass filter for eliminating a high frequency component of an output signal of the second signal mixer;
   a demodulating means for generating a demodulated signal of the received signal by processing an I baseband signal based on an output of the I low-pass filter and a Q baseband signal based on an output of the Q low-pass filter;
   an adjacent wave detecting means for detecting a signal level of the received signal in a plurality of different frequency bands based on at least one of outputs of the I low-pass filter and the Q low-pass filter and then detecting a signal level of the adjacent wave; and
   a baseband filter controlling means for variably controlling the cut-off frequencies of the I low-pass filter and the Q low-pass filter according to an output signal of the adjacent wave detecting means.

2. A direct converting receiver comprising:
   a local oscillator for generating a local signal;
   a first signal mixer for mixing a modulated signal based on a received signal with the local signal;
   a second signal mixer for mixing the modulated signal with a signal which is obtained by phase-shifting the local signal by 90 degree;
   a first I low-pass filter for extracting an I baseband signal by eliminating a high frequency component of an output signal of the first signal mixer;
   a second I low-pass filter having a cut-off frequency which is different from that of the first I low-pass filter;
   a first Q low-pass filter for extracting a Q baseband signal by eliminating a high frequency component of an output signal of the second signal mixer;
   a second Q low-pass filter having a cut-off frequency which is different from that of the first Q low-pass filter;
   a demodulating means for generating a demodulated signal of the received signal by processing the I baseband signal and the Q baseband signal;
   a first electric field strength detecting means for detecting a signal level of the received signal based on at least one of outputs of the first I low-pass filter and the first Q low-pass filter;
   a second electric field strength detecting means for detecting a signal level of the received signal based on at least one of outputs of the second I low-pass filter and the second Q low-pass filter;
   an adjacent wave detecting means for detecting a signal level of the adjacent wave based on outputs of the first electric field strength detecting means and the second electric field strength detecting means; and
   a baseband filter controlling means for variably controlling the cut-off frequencies of the first I low-pass filter and the first Q low-pass filter according to an output signal of the adjacent wave detecting means.

3. A direct converting receiver according to claim 2, wherein the first electric field strength detecting means receives outputs of the first I low-pass filter and the first Q low-pass filter and then detects the signal level of the received signal, and
   the second electric field strength detecting means receives outputs of the second I low-pass filter and the second Q low-pass filter and then detects the signal level of the received signal.

4. A direct converting receiver according to claim 2, wherein the adjacent wave detecting means receives outputs of the first electric field strength detecting means and the second electric field strength detecting means, and then generates a signal indicating the magnitude of the adjacent wave by comparing signal levels of these input signals.

5. A direct converting receiver according to claim 2, wherein the first I low-pass filter and the first Q low-pass filter have a cut-off frequency modifying means respectively, and the baseband filter controlling means outputs a filter controlling signal, which variably controls the cut-off frequencies of the first I low-pass filter and the first Q low-pass filter, based on the output signal of the adjacent wave detecting means, and then changes cut-off frequencies of the first I low-pass filter and the first Q low-pass filter discretely or continuously according to the filter controlling signal.

6. A direct converting receiver comprising:

a local oscillator for generating a local signal;

a first signal mixer for mixing a modulated signal based on a received signal with the local signal;

a second signal mixer for mixing the modulated signal with a signal which is obtained by phase-shifting the local signal by 90 degree;

an I low-pass filter for extracting an I baseband signal by eliminating a high frequency component of an output signal of the first signal mixer;

a Q low-pass filter for extracting a Q baseband signal by eliminating a high frequency component of an output signal of the second signal mixer;

a demodulating means for generating a demodulated signal of the received signal by processing the I baseband signal and the Q baseband signal;

an electric field strength detecting means for detecting a signal level of the received signal based on at least one of outputs of the I low-pass filter and the Q low-pass filter;

an electric field strength holding means for holding signal levels detected by the electric field strength detecting means under a condition that the I low-pass filter and the Q low-pass filter are set to have at least two different cut-off frequencies;

an adjacent wave detecting means for detecting a signal level of the adjacent wave based on an output of the electric field strength holding means; and a baseband filter controlling means for variably controlling cut-off frequencies of the I low-pass filter and the Q low-pass filter according to an output signal of the adjacent wave detecting means.

7. A direct converting receiver according to claim 6, further comprising an operation controlling means for controlling a setting of the cut-off frequencies of the I low-pass filter and the Q low-pass filter when an electric field strength is detected by the electric field strength detecting means and also a signal holding timing in the electric field strength holding means.

8. A direct converting receiver according to claim 6, wherein the electric field strength detecting means receives outputs of the I low-pass filter and the Q low-pass filter, and then detects a signal level of the received signal.

9. A direct converting receiver according to claim 6, wherein the adjacent wave detecting means receives at least two outputs of the electric field strength holding means and then generates a signal indicating a magnitude of the adjacent wave by comparing signal levels of input signals in these different frequency bands.

10. A direct converting receiver according to claim 6, wherein the I low-pass filter and the Q low-pass filter have a cut-off frequency modifying means respectively, and the baseband filter controlling means outputs a filter controlling signal, which variably controls cut-off frequencies of the I low-pass filter and the Q low-pass filter, based on the output signal of the adjacent wave detecting means, and then changes the cut-off frequencies of the I low-pass filter and the Q low-pass filter discretely or continuously according to the filter controlling signal.

\* \* \* \* \*